F. ILSEMANN.
WHEEL FOR MOTOR CARS.
APPLICATION FILED JAN. 5, 1914.
1,126,474.
Patented Jan. 26, 1915.
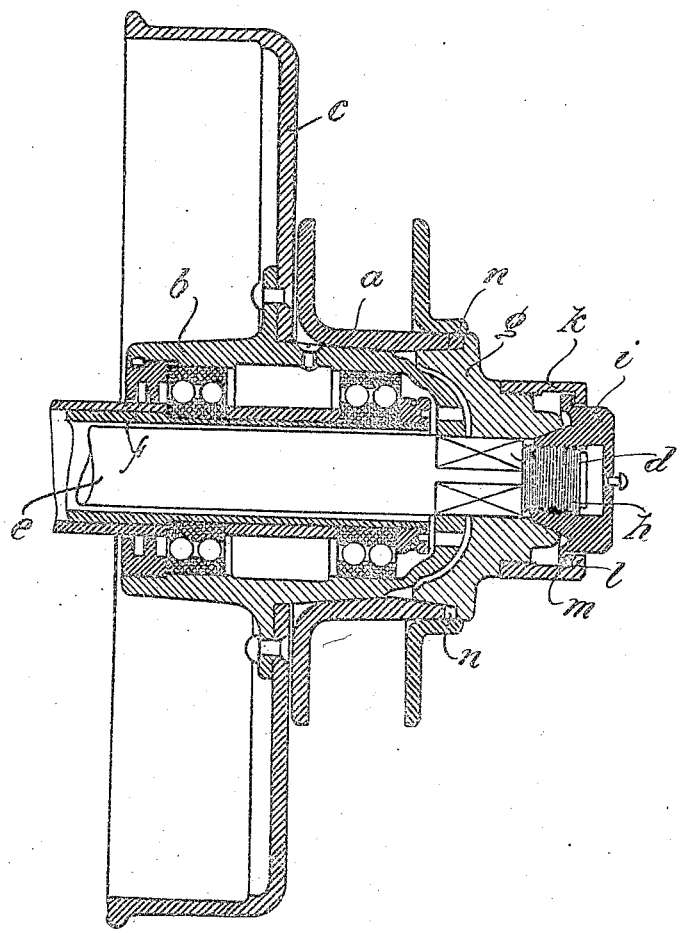
Witnesses:
Inventor:

UNITED STATES PATENT OFFICE.

FRIEDRICH ILSEMANN, OF HORN, NEAR BREMEN, GERMANY, ASSIGNOR TO THE FIRM OF METALL-INDUSTRIE UND HANDELS-GESELLSCHAFT MIT BESCHRÄNKTER HAFTUNG, OF BREMEN, GERMANY.

WHEEL FOR MOTOR-CARS.

1,126,474.  Specification of Letters Patent.  Patented Jan. 26, 1915.

Application filed January 5, 1914. Serial No. 810,375.

*To all whom it may concern:*

Be it known that I, FRIEDRICH ILSEMANN, a subject of the King of Prussia, German Emperor, residing at Horn, near Bremen, in the Kingdom of Prussia, German Empire, have invented certain new and useful Improvements in Wheels for Motor-Cars, of which the following is a specification.

This invention relates to an interchangeable wheel for motor cars which is constructed in such a manner that it can be rapidly fixed on and removed from the axle without necessitating the removal of the brake drum and the driving gear.

In the accompanying drawings the invention is shown by way of example.

The figure of the drawing represents a longitudinal section through the hind wheel bush.

According to the invention the hub $a$ which carries the spokes is placed on the cup-shaped hub $b$ on which the brake cup $c$ is fixed. The cup-shaped hub $b$ is mounted by means of ball bearings on a tube $f$ and butts against the square end of the axle $e$.

The wheel is fixed on the axle by means of a coupling body $g$ which is fixed in position by means of a nut $i$ screwed on the threaded end $h$ of the square end of the axle. The bore of the coupling body $g$ is of rectangular cross section. The coupling body $g$ has lateral arms $n$ engaging with corresponding indentations of the hub $a$. The coupling body can have any other convenient form. A sleeve $k$ fixed on the coupling body $g$ has an inwardly turned flange $l$ at its outer end engaging with an outwardly turned flange $m$ of the nut $i$ so that when the nut $i$ is unscrewed the coupling body is removed from the axle.

I claim:—

An improved interchangeable wheel for motor cars comprising in combination with the axle having a square part at its outer end terminated by the usual threaded part for the axle nut, a sleeve telescoped on said axle, a cup-shaped auxiliary hub mounted on said sleeve so that it bears with its outer end on the square part of the axle, a roller bearing between said auxiliary hub and said sleeve, a brake cup fixed to said auxiliary hub, a coupling body having a bore of square cross section mounted on the square part of the axle, lateral arms of said coupling body, a hub which carries the spokes mounted on said auxiliary hub and having indentations in its outer edge with which engage said lateral arms of said coupling body, an axle nut screwed on the threaded part of the axle and a screw cap connecting said axle nut with said coupling body, substantially as described and shown and for the purpose set forth.

In witness whereof I have hereunto set my hand in the presence of two witnesses.

FRIEDRICH ILSEMANN.

Witnesses:
 WILHELM STRUP,
 HANS MEISSNER.